June 26, 1962 J. GREEN 3,040,476
TOYS
Filed June 6, 1960
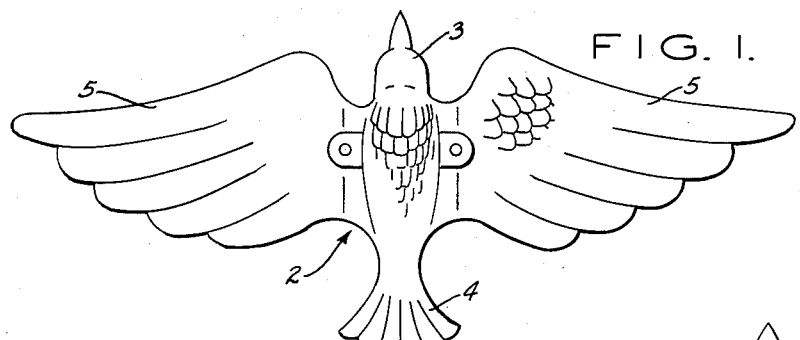
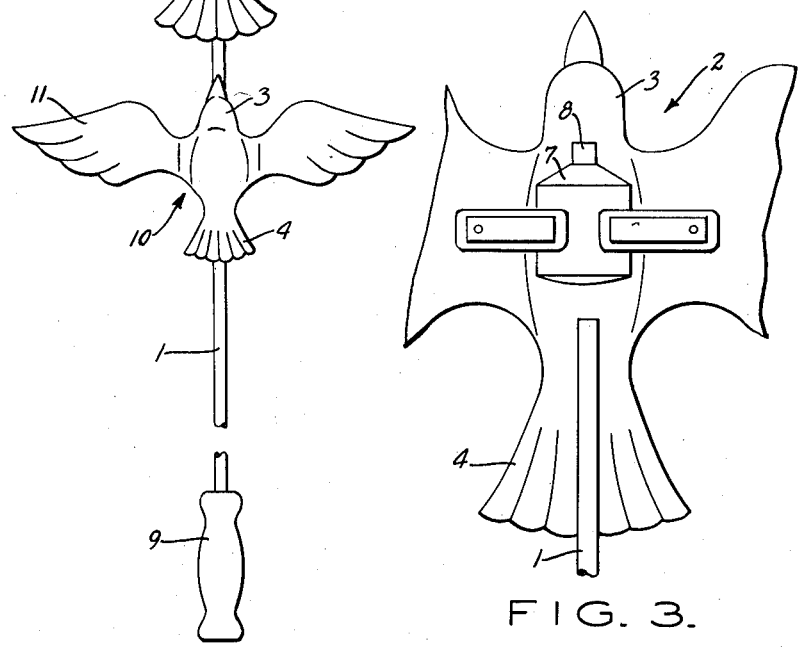
INVENTOR.
JOSEPH GREEN
BY William F. Nickel
ATTORNEY

United States Patent Office 3,040,476
Patented June 26, 1962

3,040,476
TOYS
Joseph Green, New York, N.Y. (955 Northfield Road, Woodmere, L.I., N.Y.)
Filed June 6, 1960, Ser. No. 34,330
1 Claim. (Cl. 46—118)

My invention is an improvement in toys, especially toys comprising attached parts that are capable of motion and emitting sound for the amusement of the users.

The chief aim of this invention is to produce a toy embodying a representation of a well-known object mounted on a wand or rod, and having members so connected to the object that when the rod is waved, said members are vibrated, and at the same time a sound generating device is actuated and caused to give forth an entertaining note that adds greatly to the pleasure of whoever handles the toy.

In its preferred form the invention presents the appearance of a bird with a body having outstretched wings capable of swinging up and down about their junctions with the body; and beneath the body in central position is a small compressible bulb with an opening. Affixed to the underside of each wing is a short arm that engages the bulb at each vibration of the wings, to compress it slightly and force some of the air in the bulb out through said opening. Thus a somewhat shrill note ensues, like the chirp or whistle of a living feathered creature endowed by nature with the power of flight and song.

The objects and advantages of my invention are made clear in the description that follows and the novel characteristics are defined in the appended claims. The drawings illustrate one design of the toy, but of course variations in structure may be adopted in many respects without materially changing the general principle by which the invention is distinguished.

On the drawings:

FIGURE 1 is a top plan of a toy according to my invention.

FIGURE 2 is a front view thereof; and

FIGURE 3 is a bottom plan of the sound-originating device of the toy.

On the drawings the numeral 1 indicates a rod or wand, to one side of which is affixed the representation 2 of a bird in flight with head 3, tail 4 and members 5 imitating outspread wings. The entire object is substantially flat, and flexible of plastic or some other suitable material. The rod 1 carries the imitation bird adjacent one end, and has a handle at the end opposite. Affixed to each member 4 on the underside is a short arm or dog 6 extending towards the wand 1 and engaging at its free end with a compressible hollow bulb 7 that has an open neck 8.

The toy is manipulated by grasping the wand at the handle 9 and waving it, up and down for instance, so that the wings vibrate accordingly. With every downward displacement of the members the arms 6 press upon the bulb 7, causing some of the air in the bulb to be discharged through the hollow neck 8. The whistling sound that is then heard is like the chirp or peep of any well-known real bird, and can be many times repeated.

To add to the attractive looks of the toy the rod 1 may have the representation 10 of a second bird secured thereon behind the imitation bird 2. This imitation 10 is smaller and has head 3, tail 4 and vibratable wing members 11; but no device for making sounds. The two objects 2 and 10 can be in various colors, to heighten the eye-appeal thereof.

The toy is thus constituted of relatively few parts and can be readily turned out and completed at low cost. The imitation birds are so constructed that the members 4 will vibrate freely, but will not break off or become impaired after prolonged use.

Having described my invention, what I believe to be new is:

A toy comprising a wand, an imitation of a well-known object affixed thereon, said object having flexible members extending at each side to vibrate when the wand is waved, and a sound-producing device adjacent said wand between said members operated by the motion of said members, said device comprising a hollow, compressible bulb at one end of said wand between said members, said bulb having an opening and arms on said members fixed to said members and movable therewith, at each side of said bulb engaging said bulb.

References Cited in the file of this patent

UNITED STATES PATENTS

| | | |
|---|---|---|
| 278,461 | Screven | May 29, 1883 |
| 2,637,935 | Polk | May 12, 1953 |

FOREIGN PATENTS

| | | |
|---|---|---|
| 1,159,316 | France | June 26, 1958 |